(12) United States Patent
Migita et al.

(10) Patent No.: US 11,705,773 B2
(45) Date of Patent: Jul. 18, 2023

(54) INTEGRATED MAGNETIC SHIELD AND BEARING HOLDER

(71) Applicant: Nidec Automotive Motor Americas LLC, Auburn Hills, MI (US)

(72) Inventors: Takayuki Migita, Novi, MI (US); Takumi Okada, Rochester Hills, MI (US); Bradley Dunnill, Grand Blanc, MI (US); Dan Fischer, Orion Charter Township, MI (US); Christopher Loewe, Bloomfield, MI (US); Ruben Rivera, El Paso, TX (US); Jose D Mendez, Chihuahua (MX); Daniel Mendoza, Chihuahua (MX); Manuel Gutierrez, Chihuahua (MX); Angel Noe, Chihuahua (MX)

(73) Assignee: NIDEC CORPORATION, Kyoto (JP)

( * ) Notice: Subject to any disclaimer, the term of this patent is extended or adjusted under 35 U.S.C. 154(b) by 388 days.

(21) Appl. No.: 17/150,619

(22) Filed: Jan. 15, 2021

(65) Prior Publication Data
US 2022/0231565 A1 Jul. 21, 2022

(51) Int. Cl.
*H02K 5/16* (2006.01)
*H02K 5/173* (2006.01)
*F16C 35/067* (2006.01)

(52) U.S. Cl.
CPC ......... *H02K 5/1732* (2013.01); *F16C 35/067* (2013.01); *F16C 2380/26* (2013.01)

(58) Field of Classification Search
CPC ... H02K 5/1732; H02K 11/00; F16C 2380/26; F16C 35/067
USPC .......................................................... 310/90
See application file for complete search history.

(56) References Cited

U.S. PATENT DOCUMENTS

| | | | | |
|---|---|---|---|---|
| 4,814,914 | A  * | 3/1989 | Hagiwara | .......... G11B 19/2009 |
| 9,702,403 | B2 * | 7/2017 | Beck | ........................ F16C 27/04 |
| 2019/0248406 | A1 * | 8/2019 | Kaneko | ..................... H02K 5/15 |

* cited by examiner

*Primary Examiner* — Terrance L Kenerly
(74) *Attorney, Agent, or Firm* — Keating & Bennett (57) ABSTRACT

An integrated magnetic shield and bearing holder useable with electric motors includes a shaft portion and a cover portion extending radially outward from the shaft portion. The shaft portion includes an inner wall defining a channel and a ledge extending radially inward from the inner wall. The cover portion includes a first layer, a second layer extending substantially parallel to the first layer, a magnetic shield extending between the first layer and the second layer, and an outer wall extending from the first layer and/or the second layer such that a space is defined between the outer wall and the shaft portion. The cover portion includes one or more retainers coupled to the magnetic shield to restrict movement of the magnetic shield relative to the first layer and/or the second layer.

20 Claims, 11 Drawing Sheets

INTEGRATED MAGNETIC SHIELD AND BEARING HOLDER

BACKGROUND

Some known vehicles include an electric power steering (EPS) system that helps drivers by augmenting an amount of effort needed to turn a steering wheel. Known EPS systems include one or more sensors that detect a force applied to the steering wheel, an electric motor configured to apply assisting force, and a control unit that actuates the electric motor based on the force detected by the sensors. Such sensors and electric motors may include or use one or more magnets to function. However, such magnets may form magnetic fields that interfere with other magnetic fields, emissions, radiations, and/or inductions of or in the EPS system, potentially compromising or reducing an operational reliability of the sensors, electric motor, and/or control unit. Known methods and systems for addressing this issue are generally more complicated, difficult to assemble, and/or expensive. Moreover, at least some packaging constraints, such as size and/or access constraints, may further exacerbate the deficiencies of known methods and systems.

SUMMARY

Examples of the disclosure simplify the assembly process and reduce the impact of known packaging constraints. In one aspect, a bearing holder unit is provided for use with an electric power steering apparatus. The bearing holder unit includes a shaft portion and a cover portion extending radially outward from the shaft portion. The shaft portion includes an inner wall defining a channel and a ledge extending radially inward from the inner wall. The cover portion includes a first layer, a second layer extending substantially parallel to the first layer, a magnetic shield extending between the first layer and the second layer, and an outer wall extending from the first layer and/or the second layer such that a space is defined between the outer wall and the shaft portion. The cover portion includes one or more retainers coupled to the magnetic shield to restrict movement of the magnetic shield relative to the first layer and/or the second layer.

In another aspect, a system is provided for producing an integrated magnetic shield and bearing holder. The system includes a stamping press configured to form a magnetic shield including one or more first retainers, a mold defining a cavity, and one or more rods configured to position the magnetic shield in the cavity such that molding material is configured to flow above the magnetic shield and below the magnetic shield. The molding material forms a shaft portion and a cover portion of the integrated magnetic shield and bearing holder. The cover portion includes a first layer, a second layer extending substantially parallel to the first layer, the magnetic shield extending between the first layer and the second layer, and an outer wall extending from the first layer and/or the second layer. The first layer and/or the second layer includes one or more second retainers.

In yet another aspect, a method is provided for forming an integrated magnetic shield and bearing holder. The method includes forming a magnetic shield including one or more first retainers, positioning the magnetic shield in a cavity defined by a mold, forming a shaft portion and a cover portion of the integrated magnetic shield and bearing holder, and extracting the integrated magnetic shield and bearing holder from the cavity defined by the mold. The cover portion includes a first layer, a second layer extending substantially parallel to the first layer, the magnetic shield extending between the first layer and the second layer, and an outer wall extending from the first layer and/or the second layer. The first layer and/or the second layer includes one or more second retainers.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF THE DRAWINGS

Features, aspects, and advantages of the present disclosure will become better understood when the following Detailed Description is read with reference to the accompanying drawings in which like reference characters represent like elements throughout, wherein.

Although specific features of various examples may be shown in some drawings and not in others, this is for convenience only. Any feature of any drawing may be referenced and/or claimed in combination with any feature of any other drawing.

DETAILED DESCRIPTION

The present disclosure relates to power systems and, more particularly, to an integrated magnetic shield and bearing holder. Examples described herein integrate a magnetic shield within a bearing holder. This allows a user to handle both the magnetic shield and the bearing holder simultaneously. An example integrated magnetic shield and bearing holder may include a shaft portion and a cover portion extending radially outward from the shaft portion. The magnetic shield may be integrated into the cover portion by extending a first layer above and a second layer below the magnetic shield. The cover portion includes one or more retainers coupled to the magnetic shield to restrict movement of the magnetic shield relative to one or more of the first layer or the second layer. Examples of the disclosure simplify the assembly process and reduce the impact of known packaging constraints, such as size and/or access constraints.

Certain terminology is used in the present disclosure for convenience and reference only and not in a limiting sense. For example, the terms "lower," "upper," "downward," "upward," "above," and "under," "vertical," "horizontal," and the like designate directions in relation to the perspective shown in the drawings. One of ordinary skill in the art would understand and appreciate that the example methods and systems described herein may be used in various orientations. Moreover, some "spaces," "cavities," and "openings" described herein may be interpreted to include a rim portion, an edge, or other physical feature that defines such "spaces," "cavities," openings."

Figure 1:
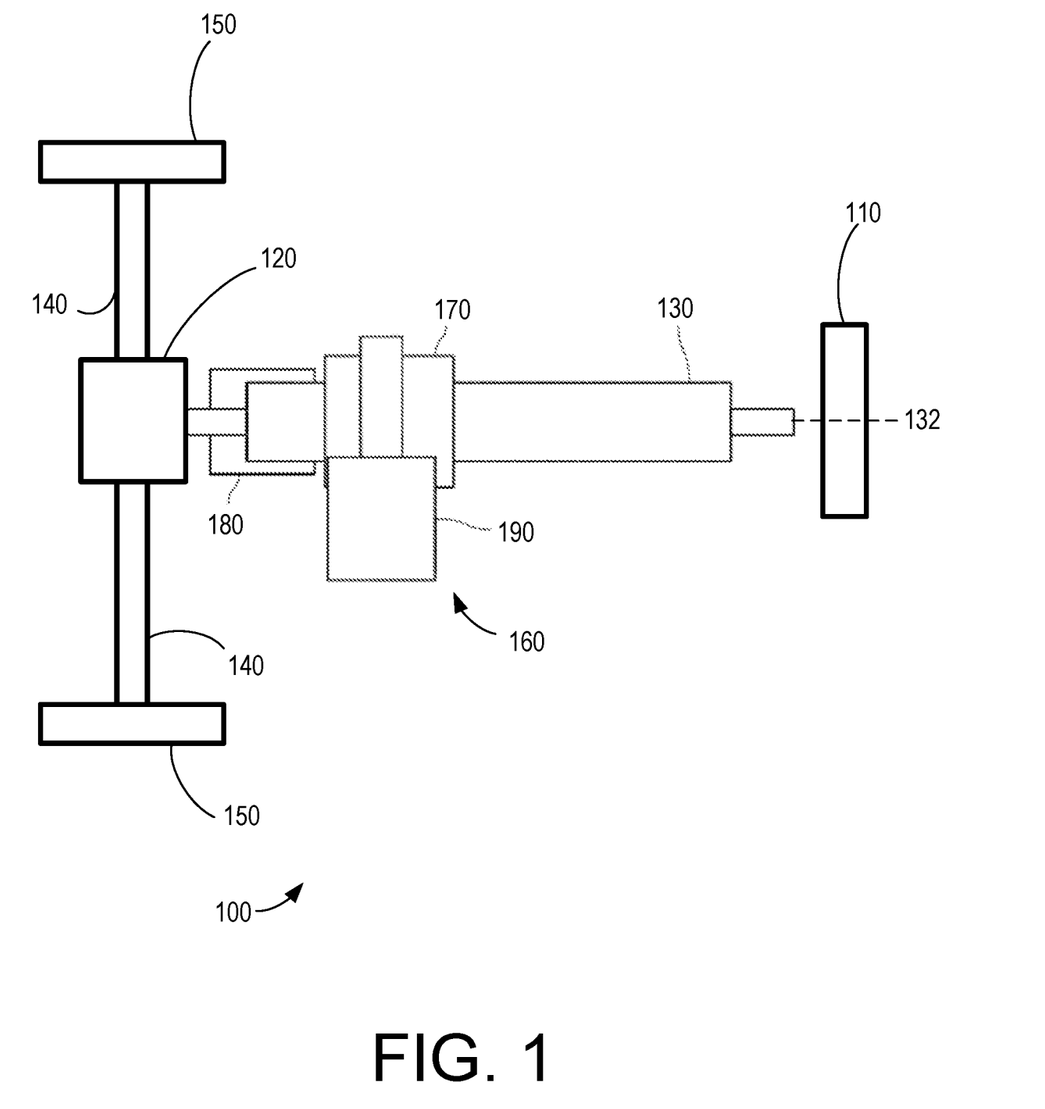
FIG. 1 is a schematic view of an example power steering system.

FIG. 1 shows a steering unit 100 that may be used to steer or maneuver a vehicle (not shown). The steering unit 100 includes a steering wheel 110, at least one steering gear 120, and a steering shaft 130 extending between the steering wheel 110 and steering gear 120. The steering wheel 110 is rotatable about a steering axis 132. The steering wheel 110 may be rotated (for example, by a driver or operator) to provide a steering input.

The steering shaft 130 is coupled to the steering wheel 110 such that the steering shaft 130 is configured to rotate with the steering wheel 110 (for example, as the steering wheel 110 rotates). In this manner, the steering input at the steering wheel 110 may be transmitted to the steering gear 120 via the steering shaft 130 (for example, in the form of a turning force or torque). The steering gear 120 is configured to covert a rotational motion of the steering shaft 130 into a linear motion. The steering gear 120 may be, for example, a pinion gear (for example, in a rack-and-pinion configuration) or a worm gear (for example, in a recirculating ball configuration). Alternatively, the steering gear 120 may be any gear used in any configuration that enables the steering unit 100 to function as described herein.

As shown in FIG. 1, the steering gear 120 may be coupled to one or more tie rods 140 extending between the steering gear 120 and one or more wheel assemblies 150. The tie rods 140 are coupled to the steering gear 120 such that the tie rods 140 are configured to move with the steering gear 120. In this manner, the steering input at the steering gear 120 may be transmitted to the wheel assemblies 150 via the tie rod 140 (for example, in the form of a push force or a pull force).

The steering unit 100 includes a power steering assembly 160 that assists the driver in steering or maneuvering the vehicle. In some examples, the power steering assembly 160 includes one or more sensors 170 configured to detect one or more input parameters, a control unit 180 configured to determine an assisting force based on the input parameters, and an electric motor 190 configured to apply the assisting force to the steering shaft 130 and/or steering gear 120. The electric motor 190 may generate a torque, for example, to provide the assisting force, which may be applied to allow the driver to steer or maneuver the vehicle with greater ease (for example, using a force smaller than that without the assisting force). Example input parameters may include, without limitation, a position (for example, rotation angle), a torque, and/or an angular velocity of the steering wheel 110, steering gear 120, and/or steering shaft 130.

Figure 2:
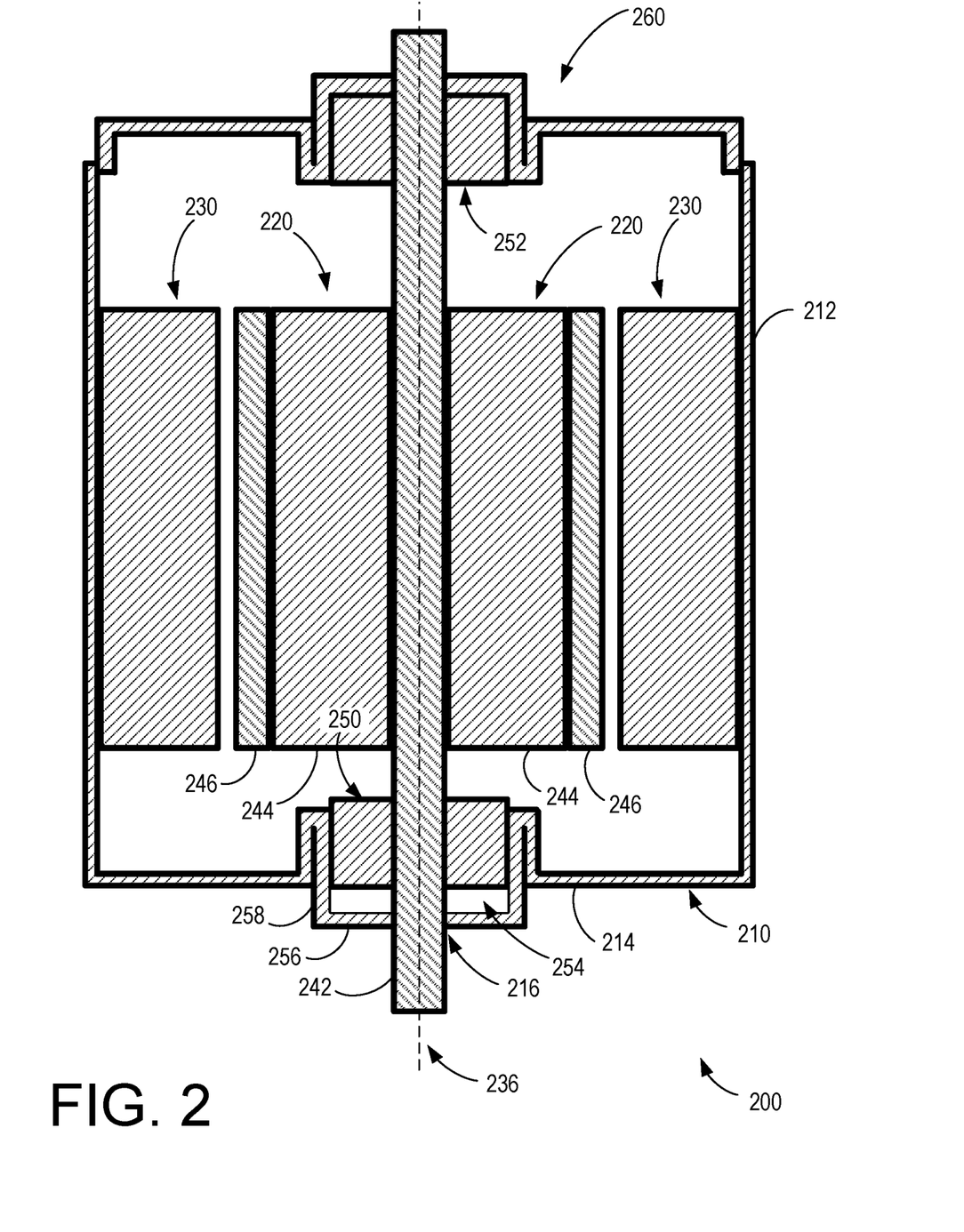
FIG. 2 is a schematic cross-sectional view of an example motor that may be used with a power steering system, such as the power steering system shown in FIG. 1.

FIG. 2 shows an example motor 200 (for example, electric motor 190) that may be used to apply an assisting force to the steering shaft 130 and/or steering gear 120. In some examples, the motor 200 includes a housing 210 that includes a side wall 212 and an end portion 214 at a lower end thereof. The side wall 212 may have a substantially cylindrical configuration and define an opening at an upper end opposite the lower end. The end portion 214 may have a generally planar configuration and define an opening 216 therethrough.

The housing 210 is sized and/or configured to house or accommodate a rotor 220 and a stator 230 therein. For example, the stator 230 may be positioned in a space defined by the side wall 212 such that the side wall 212 extends circumferentially about the stator 230. In some examples, the stator 230 is fixed or securely coupled to an inner surface of the side wall 212. As shown in FIG. 2, the stator 230 may include at least one stator core and a plurality of coils extending circumferentially about the stator core. In some examples, the coils are helically wound about the stator core.

The rotor 220 may be positioned radially inward of and spaced from the stator 230 such that the stator 230 extends circumferentially about the rotor 220. The rotor 220 is rotatable about a center axis 236. As shown in FIG. 2, the rotor 220 may include a shaft 242 extending along the center axis 236, at least one rotor core 244 coupled to the shaft 242, and a plurality of rotor magnets 246 coupled to the rotor core 244. In some examples, the rotor core 244 is fixed to a radially outer surface of the shaft 242 and extends circumferentially about the shaft 242, and the rotor magnets 246 are fixed to a radially outer surface of the rotor core 244 and extend circumferentially about the rotor core 244. In this manner, the shaft 242, rotor core 244, and rotor magnets 246 may be configured to rotate about the center axis 236 together as a single unit, for example, the rotor 220. To facilitate aligning the shaft 242 with the center axis 236, a lower bearing 250 may be positioned axially on and extend circumferentially about a lower portion of the shaft 242, and an upper bearing 252 may be positioned axially on and extend circumferentially about an upper portion of the shaft 242.

In some examples, the end portion 214 defines a bearing pocket 254 configured to support the lower bearing 250. The end portion 214 may include, for example, a center wall 256 defining the opening 216 and a side wall 258 extending upward from the center wall 256. In some examples, an outer race of the lower bearing 250 is fixed or securely coupled to a radially inner surface of the side wall 258. In this manner, the lower portion of the shaft 242 may extend through the opening 216 and be supported by the lower bearing 250.

The motor 200 includes a bearing holder 260 configured to support the upper bearing 252. The bearing holder 260 may extend, for example, across and/or adjacent to the opening defined at the upper end of the side wall 212. The bearing holder 260 may be positioned to define, for example, a first side (for example, outside the housing 210) on which a control circuit, a power supply circuit, and/or a power conversion circuit may be positioned and a second side (for example, inside the housing 210) on which the stator 230, rotor 220 may be positioned.

In some examples, the bearing holder 260 is securely coupled to the housing 210 and/or upper bearing 252. An outer race of the upper bearing 252, for example, may be fixed or securely coupled to a radially inner surface of the bearing holder 260. The bearing holder 260 is configured to prevent or restrict the upper bearing 252 from wobbling with respect to the center axis 236, even under vibration conditions, thereby enabling the motor 200 to exhibit stable rotation performance. In some examples, the bearing holder 260 is fabricated from a strong, rigid material, such as metal.

Figure 3:
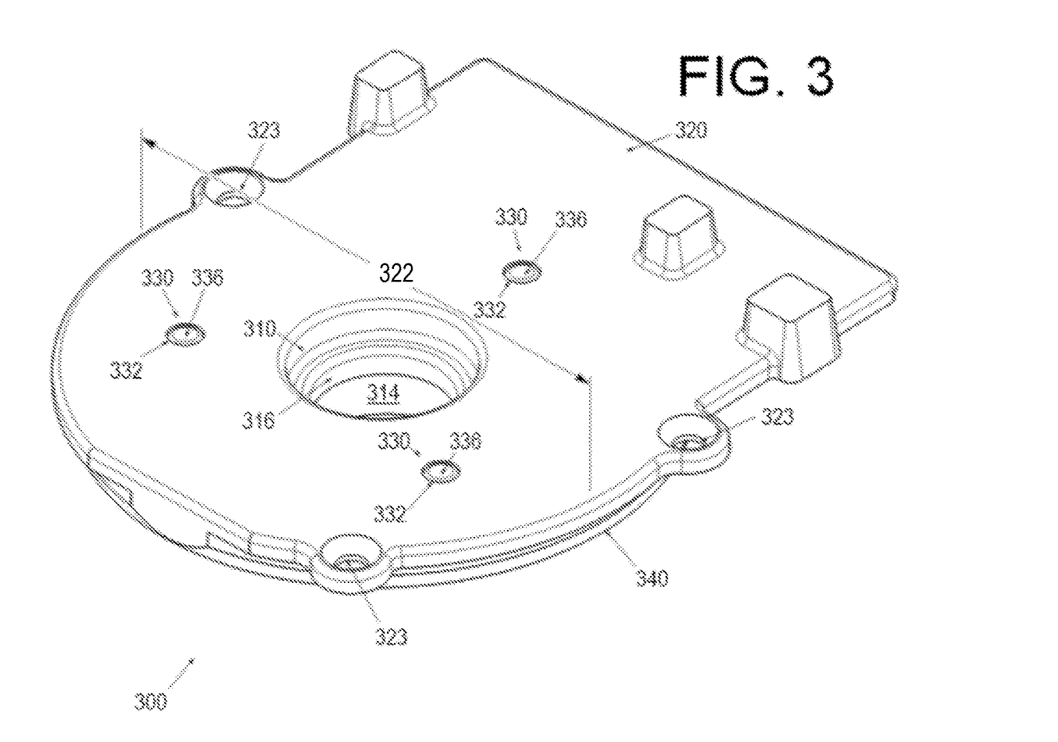
FIG. 3 is a perspective view of an example integrated magnetic shield and bearing holder that may be used with a motor, such as the motor shown in FIG. 2.
Figure 4:
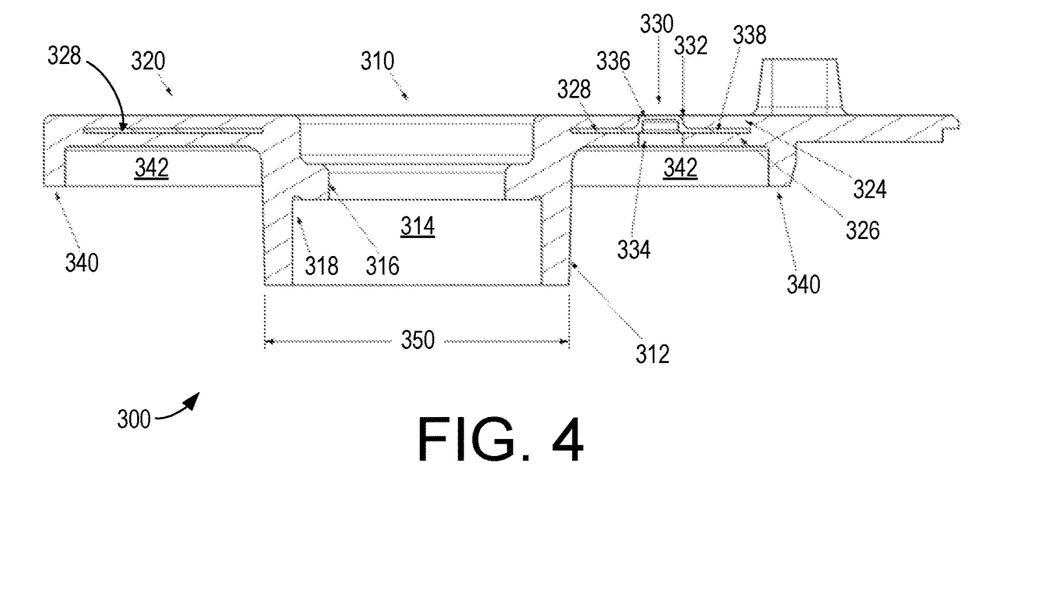
FIG. 4 is a cross-sectional view of the integrated magnetic shield and bearing holder shown in FIG. 3.

FIGS. 3 and 4 show an example integrated magnetic shield and bearing holder or bearing holder unit 300 (for example, bearing holder 260) including a shaft portion 310. The shaft portion 310 has a substantially tubular configuration that allows the shaft 242 to rotate therein. As shown in FIGS. 3 and 4, the shaft portion 310 may include a side wall 312 (for example, a first or inner wall) defining a channel 314 through which the shaft 242 may extend.

The shaft portion 310 may include a ledge 316 extending radially inward from a radially inner surface of the side wall 312 and/or into the channel 314. The ledge 316 is coupled to the side wall 312 to define a bearing pocket 318 (shown in FIG. 4) therebetween. The side wall 312 and ledge 316 are sized and/or configured to house or accommodate the upper bearing 252 in the bearing pocket 318. In some examples, the upper bearing 252 may be seated in the bearing pocket 318 such that an outer race of the upper bearing 252 is fixed or securely coupled to a radially inner surface of the side wall 312. In this manner, the bearing holder unit 300 may be used to support and/or maintain a position of the upper bearing 252.

The bearing holder unit 300 includes a cover portion 320 extending radially outward from the shaft portion 310. The cover portion 320 has a diameter or width 322 that enables the cover portion 320 to extend across and/or adjacent to the opening defined at the upper end of the side wall 212 of the housing 210. In some examples, the cover portion 320 includes one or more openings 323 (shown in FIG. 3) defined axially therethrough (for example, parallel to the center axis 236) for use in coupling the bearing holder unit 300 to the housing 210 of the motor 200. When the bearing holder unit 300 is coupled to the housing 210 (for example, using the openings 323), the shaft portion 310 is configured to support and/or maintain a position of the upper bearing 252 such that an upper portion of the shaft 242 may extend through the channel 314.

The cover portion 320 includes a first layer 324 (shown in FIG. 4), a second layer 326 (shown in FIG. 4), and a magnetic shield 328 (shown in FIG. 4; also shown in FIG. 5, described below) between the first layer 324 and second layer 326. The first layer 324, second layer 326, and magnetic shield 328 may extend laterally or horizontally substantially parallel to each other. As shown in FIG. 4, the first layer 324 may extend over or at a higher elevation than the magnetic shield 328, and the magnetic shield 328 may extend over or at a higher elevation than the second layer 326. The first layer 324 and/or second layer 326 have a thickness that enables the cover portion 320 to restrict movement of the magnetic shield 328 while facilitating optimizing material reduction. In some examples, the first layer 324 has a thickness (for example, a first thickness) that is equal or substantially similar to a thickness of the second layer 326 (for example, a second thickness). Alternatively, the first layer 324 and second layer 326 may have different thicknesses.

The cover portion 320 may include one or more retainers or features 330 that enable the first layer 324, second layer 326, and/or magnetic shield 328 to be aligned with each other and restrict relative movement therebetween. In this manner, the features 330 may prevent or restrict rotation of the magnetic shield 328 relative to the first layer 324 and/or second layer 326. Additionally, the features 330 may prevent or restrict translation of the magnetic shield 328 relative to the first layer 324 and/or second layer 326. For example, the features 330 may restrict axial movement (for example, movement along the center axis 236) and/or lateral movement (for example, movement perpendicular to the center axis 236) of the magnetic shield 328 relative to the first layer 324 and/or second layer 326.

As shown in FIGS. 3 and 4, the first layer 324 defines one or more first openings 332 extending therethrough, the second layer 326 defines one or more second openings 334 (shown in FIG. 4) extending therethrough, and the features 330 of the magnetic shield 328 includes one or more projections or protrusions 336 extending from a base portion 338 (shown in FIG. 4). Alternatively, the magnetic shield 328 may include one or more openings and the first layer 324 and/or second layer 326 may include one or more projections extending therefrom and through the openings.

The protrusions 336 may be sized and/or configured to extend at least partially through the first openings 332 and/or second openings 334. The protrusions 336 may extend in a common or the same direction. In some examples, the protrusions 336 extend upward (for example, toward the first layer 324) and are aligned with the first openings 332 such that the protrusions 336 extend into and/or are seated in the first openings 332. In some examples, the protrusions 336 do not extend upward beyond an upper surface of the first layer 324 to ensure that the bearing holder unit 300 conforms to an allotted packaging environment. Alternatively, at least one protrusion 336 may extend downward (for example, toward the second layer 326) and be aligned with at least one second opening 334 such that the protrusions 336 extends into and/or is seated in the second opening 334.

The cover portion 320 may include an outer wall 340 (for example, a second wall) extending downward from the first layer 324 and/or second layer 326 such that a space 342 is defined between the outer wall 340 and the shaft portion 310. The sizing and shape of the space 342 facilitates optimizing material reduction while restricting movement of the magnetic shield 328. Additionally, a portion of the outer wall 340 may extend between the first layer 324 and/or second layer 326 to extend circumferentially at least partially about the magnetic shield 328.

Figure 5:
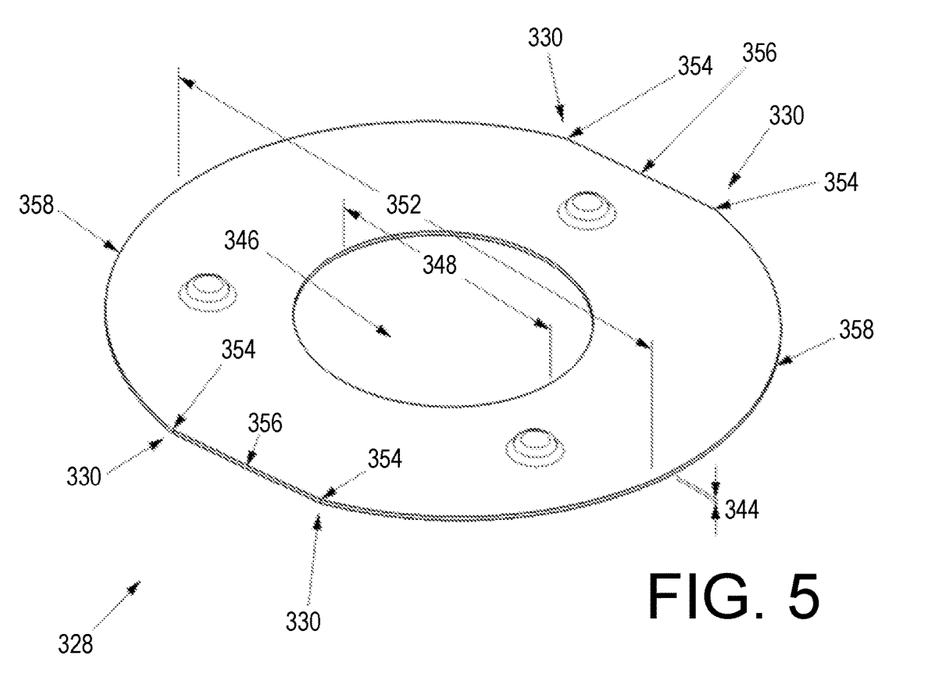
FIG. 5 is a perspective view of an example magnetic shield that may be used with a bearing holder, such as the integrated magnetic shield and bearing holder shown in FIGS. 3 and 4.

FIG. 5 shows the magnetic shield 328 free from the rest of the bearing holder unit 300. The magnetic shield 328 is fabricated from at least one ferromagnetic metal (for example, iron, nickel, cobalt, steel), and has a thickness 344 that enables the magnetic shield 328 to obstruct or redirect a magnetic field. The thickness 344 of the magnetic shield 328 may be less than a thickness of the first layer 324 and/or the second layer 326. In some examples, the thickness 344 is approximately 0.02 inches (in.) or 0.5 millimeters. Alternatively, the magnetic shield 328 may have any thickness 344 that enables the bearing holder unit 300 to function as described herein, including a thickness greater than or equal to the thickness of the first layer 324 and/or the second layer 326.

The magnetic shield 328 defines an opening 346 extending therethrough. The magnetic shield 328 may be aligned such that the opening 346 is coaxial with the center axis 236 (for example, when integrated into a bearing holder unit 300 that is coupled to a housing 210). In some examples, the opening 346 has a diameter or width 348 that is the same as or substantially similar to a diameter of a radially outer surface (for example, an outer diameter) of the side wall 312 of the shaft portion 310 (for example, width 350, shown in FIG. 4). Additionally, the magnetic shield 328 may have a diameter or width 352 that is less than, but spans a substantial portion of, the width 322 of the cover portion 320. As shown in FIG. 5, the magnetic shield 328 may have a substantially annular configuration.

In some examples, a base portion 338 of the magnetic shield 328 includes one or more features 330 at a radially outer surface that facilitate aligning the magnetic shield 328 relative to the first layer 324 and/or second layer 326. For example, the radially outer surface of the base portion 338 may include a plurality of vertices 354 between which at least one chord portion 356 extends. The vertices 354 and/or chord portion 356 may engage a radially inner surface of the outer wall 340 such that rotation and/or translation of the magnetic shield 328 relative to the first layer 324 and/or second layer 326 is prevented or restricted. In some examples, the radially outer surface of the base portion 338 includes a pair of opposite chord portions 356, each between a pair of opposite curved portions 358. Alternatively, the base portion 338 may have any configuration that enables the bearing holder unit 300 to function as described herein.

Figure 6:
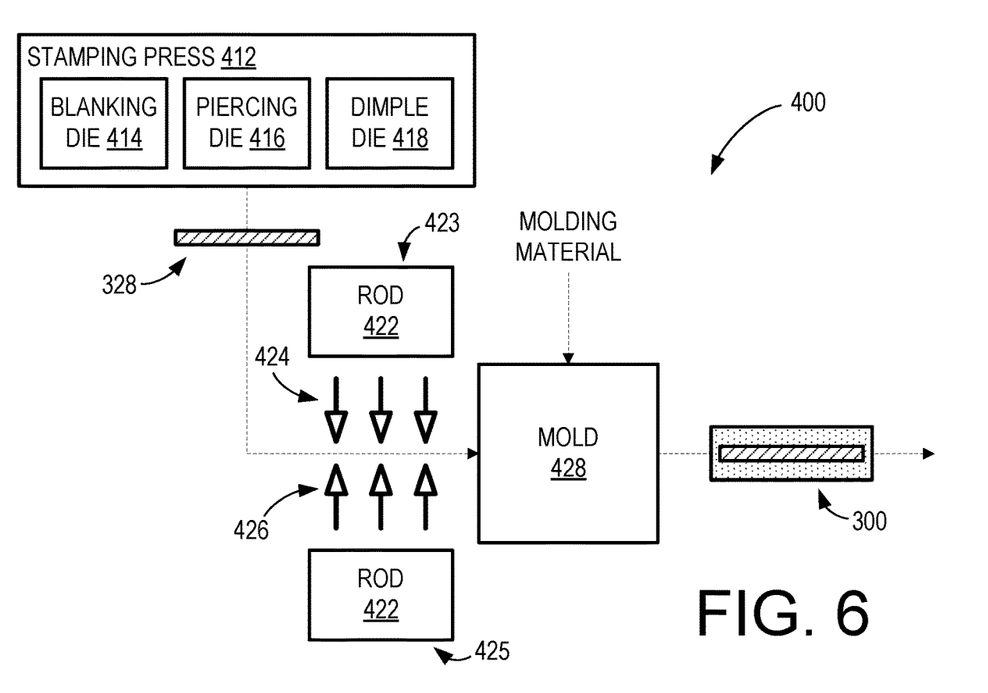
FIG. 6 is a block diagram of an example system that may be used to manufacture an integrated magnetic shield and bearing holder.
Figure 7:
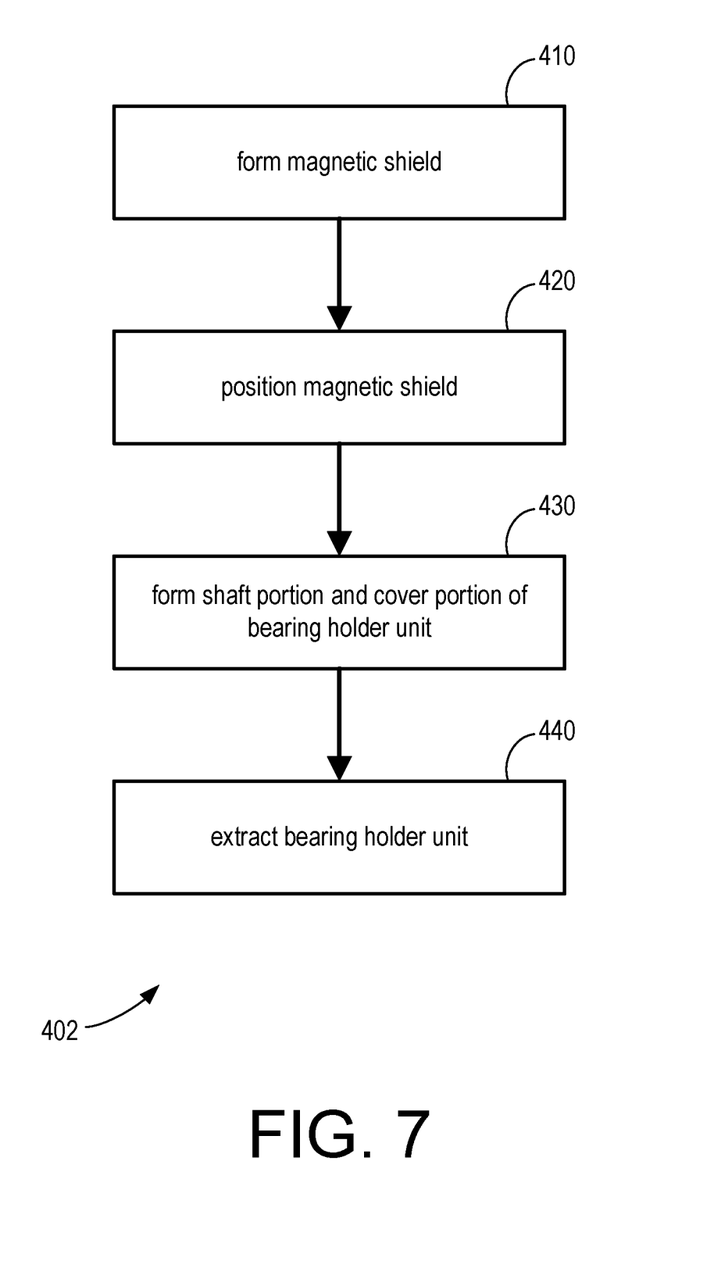
FIG. 7 is a flowchart of an example method of manufacturing an integrated magnetic shield and bearing holder.

FIG. 6 shows a system 400 for producing or manufacturing the bearing holder unit 300 including at least one metalworking tool or machine. FIG. 7 shows a method 402 of producing or manufacturing the bearing holder unit 300 using the system 400. In some examples, the magnetic shield 328 is formed at operation 410 (shown in FIG. 7) using a stamping press 412 (shown in FIG. 6). The stamping press 412 is configured to form the magnetic shield 328 from a sheet of ferromagnetic metal. The stamping press 412 may include, for example, a blanking punch and/or die 414 (shown in FIG. 6) that forms a substantially planar piece having a circular or round configuration, and/or a piercing punch and/or die 416 (shown in FIG. 6) that creates an opening 346 through the piece and/or sheet. Alternatively, the magnetic shield 328 may be formed using any other machine and/or device that enables the system 400 to function as described herein. For example, the opening 346 may be formed using a drill bit, a reamer, and/or a boring tool.

The magnetic shield 328 may be formed to include one or more features 330 (for example, protrusions 336, vertices 354, chord portions 356). For example, the blanking die 414 may be configured to form the magnetic shield 328 such that a radially outer surface of the base portion 338 includes at least one vertex 354 and/or chord portion 356. Alternatively, the magnetic shield 328 may be formed such that the radially outer surface of the base portion 338 defines a round shape (for example, a circle).

In some examples, the stamping press 412 includes a dimple die 418 (shown in FIG. 6) that forms or creates one or more protrusions 336. Alternatively, one or more features 330 may be formed or created using any device or mechanism that enables the system 400 to function as described herein.

The magnetic shield 328 may be held or positioned at operation 420 (shown in FIG. 7) using one or more posts or rods 422 (shown in FIG. 6). For example, the rods 422 may include an upper rod 423 (shown in FIG. 6) that applies a downward force 424 (shown in FIG. 6) on the magnetic shield 328 at the protrusion 336 to support the magnetic shield 328 from above, and a lower rod 425 (shown in FIG. 6) that applies an upward force 426 (shown in FIG. 6) on the magnetic shield 328 at the protrusion 336 to support the magnetic shield 328 from below.

In some examples, the magnetic shield 328 and rods 422 are positioned in a cavity defined by a mold 428 (shown in FIG. 6). In this manner, as a molding material (for example, a metal material) is channeled toward the cavity and/or the cavity is filled with the molding material, the molding material may flow around the magnetic shield 328 and rods 422 to form at operation 430 (shown in FIG. 7) the shaft portion 310 and cover portion 320 of the bearing holder unit 300 such that the magnetic shield 328 is fabricated from a first material (for example, ferromagnetic metal), and the shaft portion 310, first layer 324, second layer 326, and/or outer wall 340 are fabricated from a second material different from the first material. For example, the molding material flowing radially inward the magnetic shield 328 may form the shaft portion 310, the molding material flowing above the magnetic shield 328 may form the first layer 324, the molding material flowing below the magnetic shield 328 may form the second layer 326, and the molding material flowing radially outward of the magnetic shield 328 may form the outer wall 340. In this manner, the first openings 332 may have a diameter or width that are the same as or substantially similar to a diameter or width of the upper rod 423, and/or the second openings 334 may have a diameter or width that are the same as or substantially similar to a diameter or width of the lower rod 425.

After the molding material is cooled, a bearing holder unit 300 is extracted at operation 440 (shown in FIG. 7). The bearing holder unit 300 includes one or more first features 330 that facilitate restricting rotation of the magnetic shield 328 relative to the first layer 324 and/or second layer 326 (for example, first opening 332, second opening 334, protrusion 336, outer wall 340, vertex 354, chord portion 356), and one or more second features 330 that facilitate restricting translation of the magnetic shield relative to the first layer 324 and/or second layer 326 (for example, first opening 332, second opening 334, protrusion 336, outer wall 340, vertex 354, chord portion 356).

Figure 8:
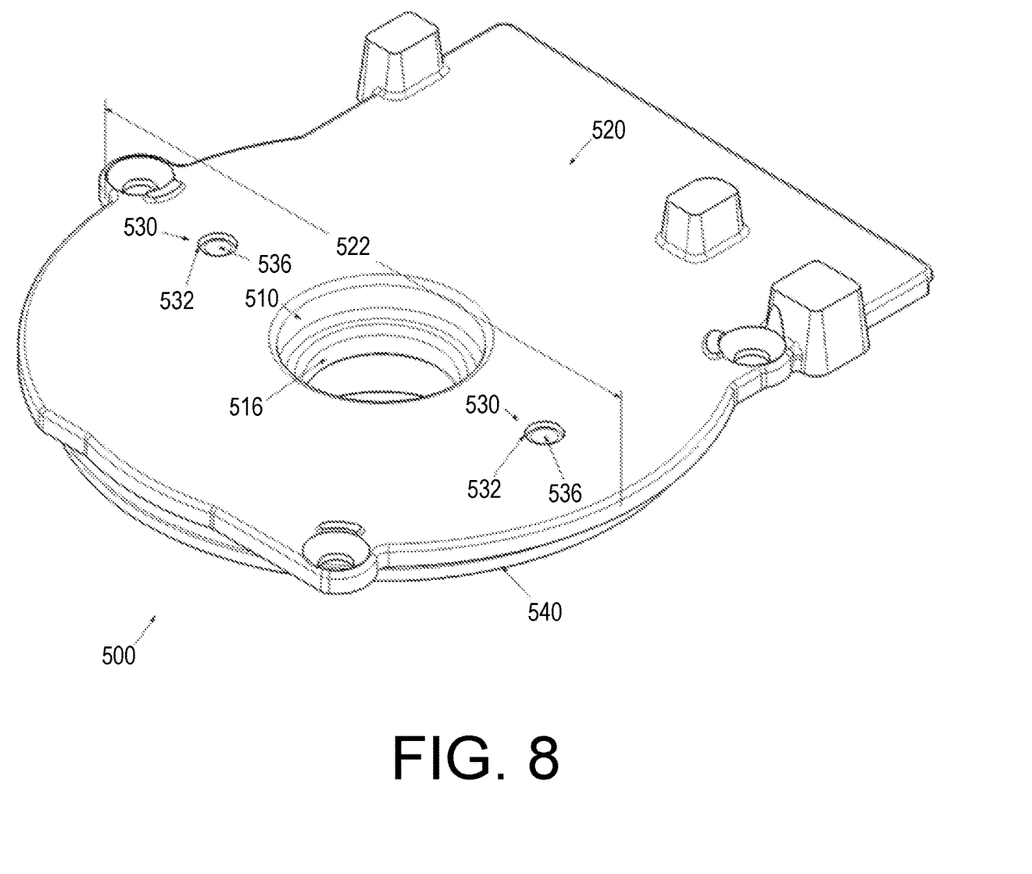
FIG. 8 is an upper perspective view of another example integrated magnetic shield and bearing holder that may be used with a motor, such as the motor shown in FIG. 2.
Figure 9:
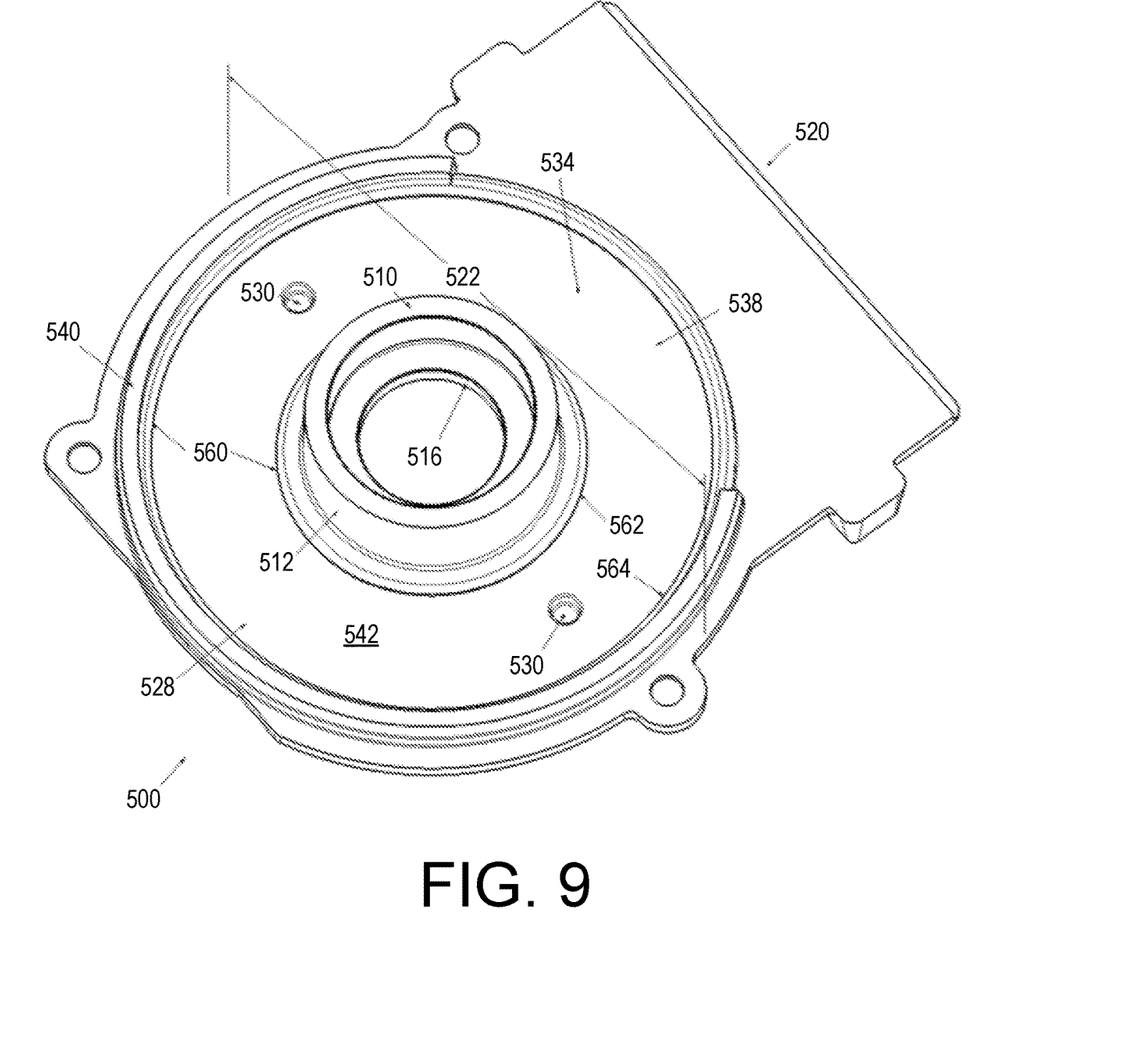
FIG. 9 is a lower perspective view of the integrated magnetic shield shown in FIG. 8.
Figure 10:
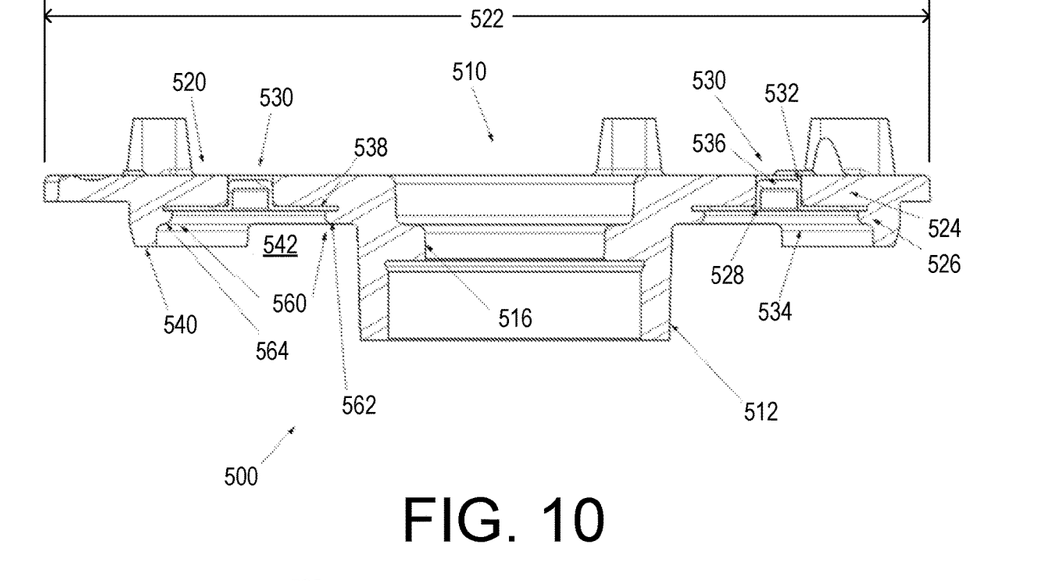
FIG. 10 is a cross-sectional view of the integrated magnetic shield shown in FIGS. 8 and 9.

FIGS. 8-10 show another example integrated magnetic shield and bearing holder or bearing holder unit 500 (for example, bearing holder 260). The bearing holder unit 500 includes a shaft portion 510 and a cover portion 520 extending radially outward from the shaft portion 510. The shaft portion 510 includes a side wall 512 and a ledge 516 extending radially inward from a radially inner surface of the side wall 512. In this manner, the shaft portion 510 may be used to support an upper bearing 252 through which a shaft 242 is extended.

The cover portion 520 has a diameter or width 522 that enables the cover portion 520 to extend across and/or adjacent to the opening defined at the upper end of the side wall 212 of the housing 210. The cover portion 520 includes a first layer 524 (shown in FIG. 10), a second layer 526 (shown in FIG. 10), and a magnetic shield 528 (shown in FIGS. 9 and 10) between the first layer 524 and second layer 526. In some examples, the cover portion 520 includes an outer wall 540 extending downward from the first layer 524 and/or second layer 526 such that a space 542 (shown in FIGS. 9 and 10) is defined between the outer wall 540 and the shaft portion 510. The sizing and shape of the space 542 facilitates optimizing material reduction while restricting movement of the magnetic shield 528. Additionally, a portion of the outer wall 540 may extend between the first layer 524 and/or second layer 526 to extend circumferentially at least partially about the magnetic shield 528. Except as otherwise described below, it should be understood that the shaft portion 510 and cover portion 520, including the magnetic shield 528, are substantially similar to, and function in substantially the same manner as, the shaft portion 310 and cover portion 320 described above in regard to the bearing holder unit 300.

The first layer 524 and/or second layer 526 have a thickness that enables the cover portion 520 to restrict movement of the magnetic shield 528 while facilitating optimizing material reduction. For example, the first layer 524 may have a thickness that is greater than a thickness of the second layer 526. In some examples, the thickness of the first layer 524 is greater than a thickness of the first layer 324 of the bearing holder unit 300. Alternatively, the first layer 524, second layer 526, and/or magnetic shield 528 may have any thickness that enables the bearing holder unit 500 function as described herein.

The cover portion 520 may include one or more retainers or features 530 that enable the first layer 524, second layer 526, and/or magnetic shield 528 to be aligned with each other and restrict relative movement therebetween. In this manner, the features 530 may prevent or restrict rotation of the magnetic shield 528 relative to the first layer 524 and/or second layer 526. Additionally, the features 530 may prevent or restrict translation of the magnetic shield 528 relative to the first layer 524 and/or second layer 526. For example, the features 530 may restrict axial movement (for example, movement along the center axis 236) and/or lateral movement (for example, movement perpendicular to the center axis 236) of the magnetic shield 528 relative to the first layer 524 and/or second layer 526.

As shown in FIGS. 8-10, the first layer 524 defines one or more first openings 532 (shown in FIGS. 8 and 10) extending therethrough, the second layer 526 defines a second opening 534 (shown in FIGS. 9 and 10) extending therethrough, and the magnetic shield 528 includes one or more protrusions 536 (shown in FIGS. 8 and 10) extending from a base portion 538 (shown in FIGS. 9 and 10). The protrusions 536 may be sized and/or configured to extend at least partially through the first openings 532. In this manner, the protrusions 536 may be aligned with the first openings 532 such that the protrusions 536 extend into and/or are seated in the first openings 532. In some examples, the protrusions 536 do not extend upward beyond an upper surface of the first layer 524 to ensure that the bearing holder unit 500 conforms to an allotted packaging environment.

Figure 11:
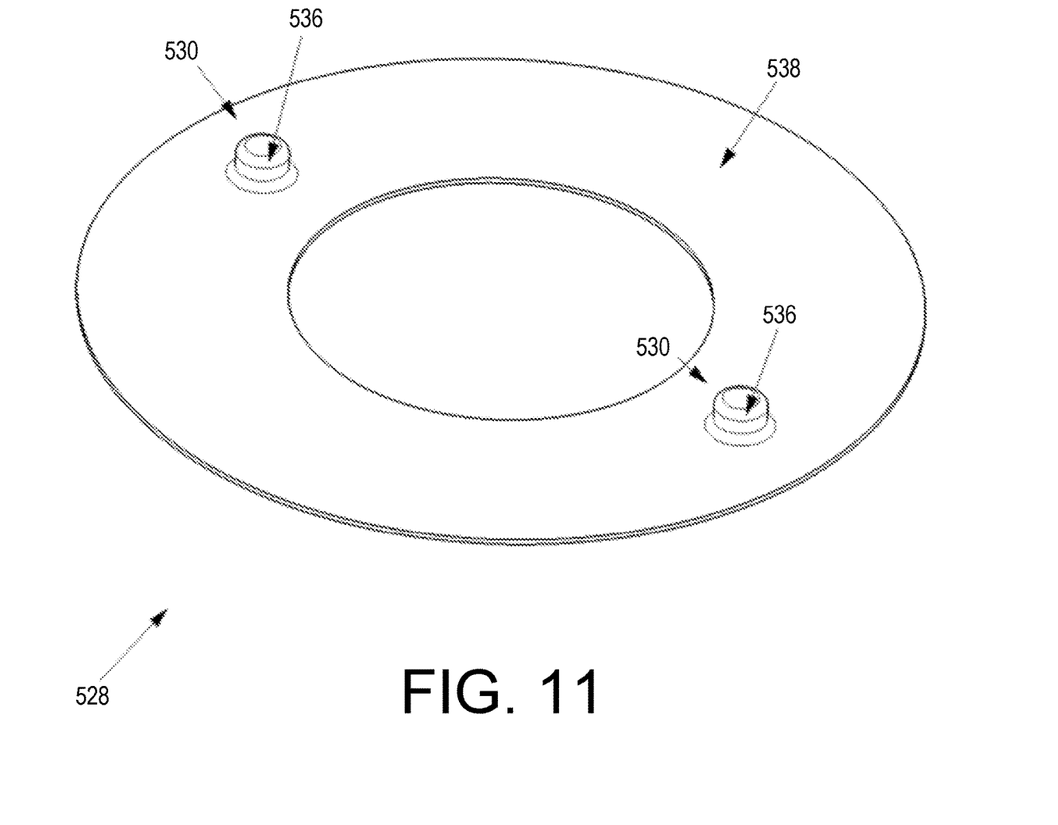
FIG. 11 is a perspective view of an example magnetic shield that may be used with a bearing holder, such as the integrated magnetic shield and bearing holder shown in FIGS. 8-10.

The second layer 526 may include one or more lips 560 (shown in FIGS. 9 and 10) that define the second opening 534. In some examples, the lips 560 extend circumferentially about the center axis 236. The lips 560 may include, for example, an inner lip 562 (shown in FIGS. 9 and 10) extending radially outward from and circumferentially along the shaft portion 510 and/or an outer lip 564 (shown in FIGS. 9 and 10) extending radially inward from and circumferentially along the outer wall 540. In this manner, the magnetic shield 528 may be retained by or held into the bearing holder unit 500. The lips 560 are configured to couple to the magnetic shield 528 to facilitate supporting the magnetic shield 528. In some examples, the inner lip 562 and/or outer lip 564 extend radially from and circumferentially along the shaft portion 510 and/or outer wall 540, respectively, such that the second opening 534 has an annular configuration. FIG. 11 shows the magnetic shield 528 free from the rest of the bearing holder unit 500.

The bearing holder unit 500 may be produced or manufactured using the system 400 and/or method 402. To form the lips 560 and define the second opening 534, the lower rod 425 may have an annular configuration having an inner diameter that is a predetermined amount (for example, two times a length of the inner lip 562) greater than an inner diameter of the magnetic shield 528 and/or an outer diameter that is a predetermined amount (for example, two times a length of the outer lip 564) less than an outer diameter of the magnetic shield 528. The bearing holder unit 500 may be formed to include and/or define one or more first features 530 that facilitate restricting rotation of the magnetic shield 528 relative to the first layer 524 and/or second layer 526 (for example, first opening 532, protrusion 536), and one or more second features 530 that facilitate restricting translation of the magnetic shield relative to the first layer 524 and/or second layer 526 (for example, first opening 532, protrusion 536, outer wall 540, lip 560, inner lip 562, outer lip 564).

Figure 12:
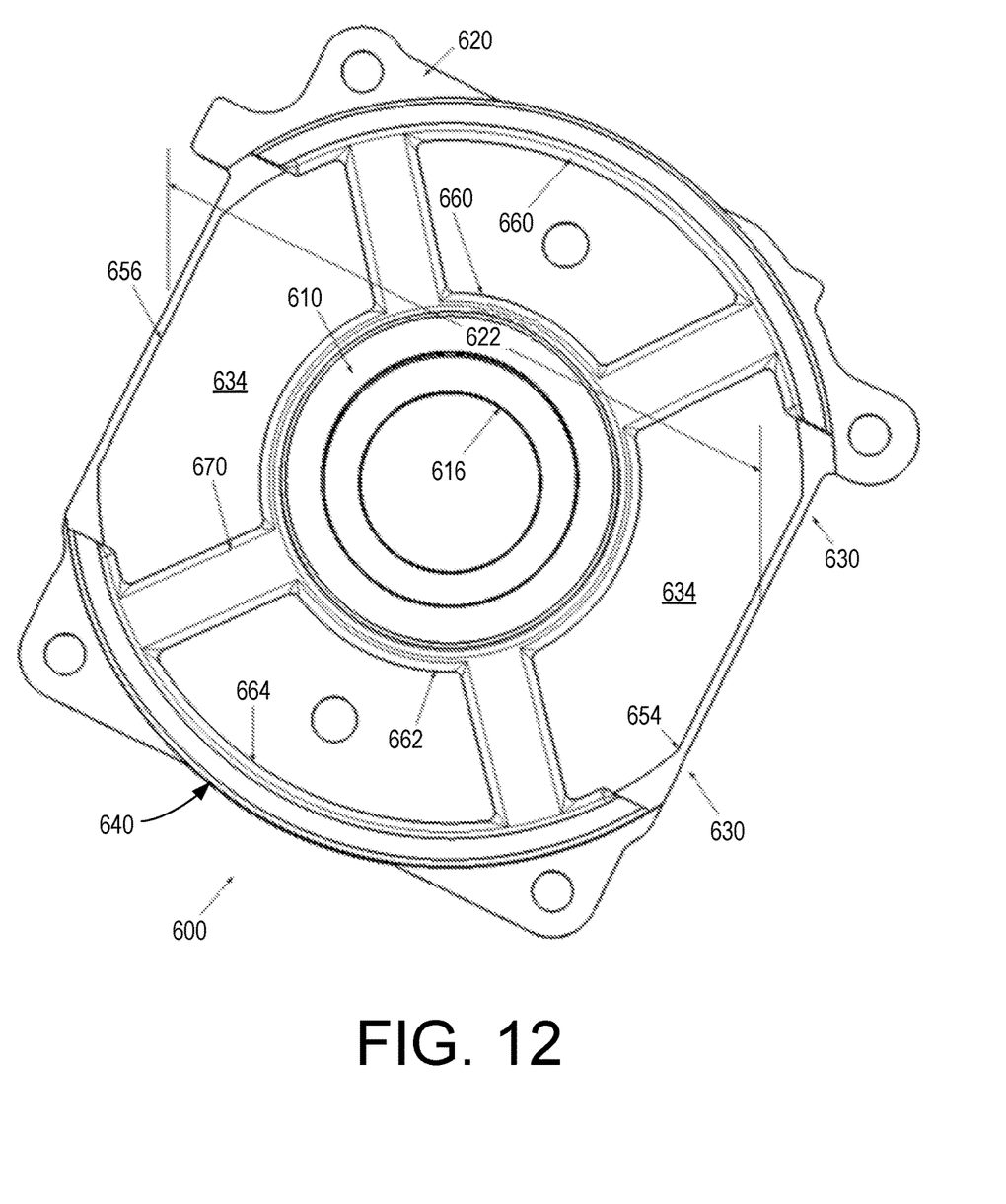
FIG. 12 is a lower plan view of yet another example integrated magnetic shield and bearing holder that may be used with a motor, such as the motor shown in FIG. 2.
Figure 13:
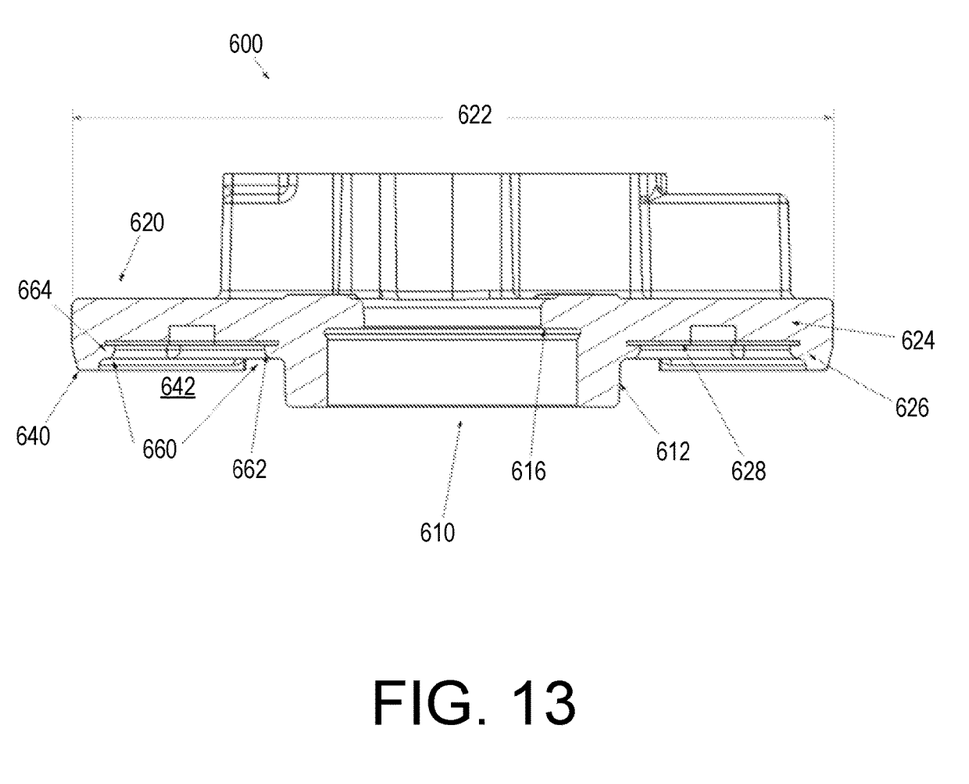
FIG. 13 is a cross-sectional view of the integrated magnetic shield shown in FIG. 12.

FIGS. 12 and 13 show yet another example integrated magnetic shield and bearing holder or bearing holder unit 600 (for example, bearing holder 260). The bearing holder unit 600 includes a shaft portion 610 and a cover portion 620 extending radially outward from the shaft portion 610. The shaft portion 610 includes a side wall 612 (shown in FIG. 13) and a ledge 616 extending radially inward from a radially inner surface of the side wall 612. In this manner, the shaft portion 610 may be used to support an upper bearing 252 through which a shaft 242 is extended.

The cover portion 620 has a diameter or width 622 that enables the cover portion 620 to extend across and/or adjacent to the opening defined at the upper end of the side wall 212 of the housing 210. The cover portion 620 includes a first layer 624 (shown in FIG. 13), a second layer 626, and a magnetic shield 628 between the first layer 624 and second layer 626. In some examples, the cover portion 620 includes an outer wall 640 extending downward from the first layer 624 and/or second layer 626 such that a space 642 is defined between the outer wall 640 and the shaft portion 610. Additionally, a portion of the outer wall 640 may extend between the first layer 624 and/or second layer 626 to extend circumferentially at least partially about the magnetic shield 628. Except as otherwise described below, it should be understood that the shaft portion 610 and cover portion 620, including the magnetic shield 628, are substantially similar to, and function in substantially the same manner as, the shaft portion 310 and cover portion 320 described above in regard to the bearing holder unit 300 and/or the shaft portion 510 and cover portion 520 described above in regard to the bearing holder unit 500.

The first layer 624 may have a thickness that is greater than a thickness of the second layer 626. In some examples, the thickness of the first layer 624 is greater than a thickness of the first layer 324 of the bearing holder unit 300 and/or of the first layer 524 of the bearing holder unit 500. Alternatively, the first layer 624, second layer 626, and/or magnetic shield 628 may have any thickness that enables the bearing holder unit 600 function as described herein.

The cover portion 620 may include one of more retainers or features 630 (shown in FIG. 12) that enable the first layer 624, second layer 626, and/or magnetic shield 628 to be aligned with each other and restrict relative movement therebetween. In this manner, the features 630 may prevent or restrict rotation of the magnetic shield 628 relative to the first layer 624 and/or second layer 626. Additionally, the features 630 may prevent or restrict translation of the magnetic shield 628 relative to the first layer 624 and/or second layer 626. For example, the features 630 may restrict axial movement (for example, movement along the center axis 236) and/or lateral movement (for example, movement perpendicular to the center axis 236) of the magnetic shield 628 relative to the first layer 624 and/or second layer 626.

As shown in FIG. 12, the first layer 624, second layer 626, and/or magnetic shield 628 may include a plurality of vertices 654 at a radially outer surface of the first layer 624, second layer 626, and/or magnetic shield 628 between which at least one chord portion 656 extends. The vertices 654 and/or chord portion 656 may engage a radially inner surface of the outer wall 640 such that rotation and/or translation of the magnetic shield 628 relative to the first layer 624 and/or second layer 626 is prevented or restricted. In some examples, the radially outer surfaces of the first layer 624, second layer 626, and/or magnetic shield 628 include a plurality of opposite chord portions 656, each between an adjacent pair of curved portions 658. Alternatively, the first layer 624, second layer 626, and/or magnetic shield 628 may have any configuration that enables the bearing holder unit 600 to function as described herein.

The second layer 626 may include one or more lips 660 extending circumferentially about the center axis 236. The lips 660 may include, for example, an inner lip 662 extending radially outward from and circumferentially along the shaft portion 610 and/or an outer lip 664 extending radially inward from and circumferentially along the outer wall 640. In this manner, the magnetic shield 628 may be retained by or held into the bearing holder unit 600.

Figure 14:
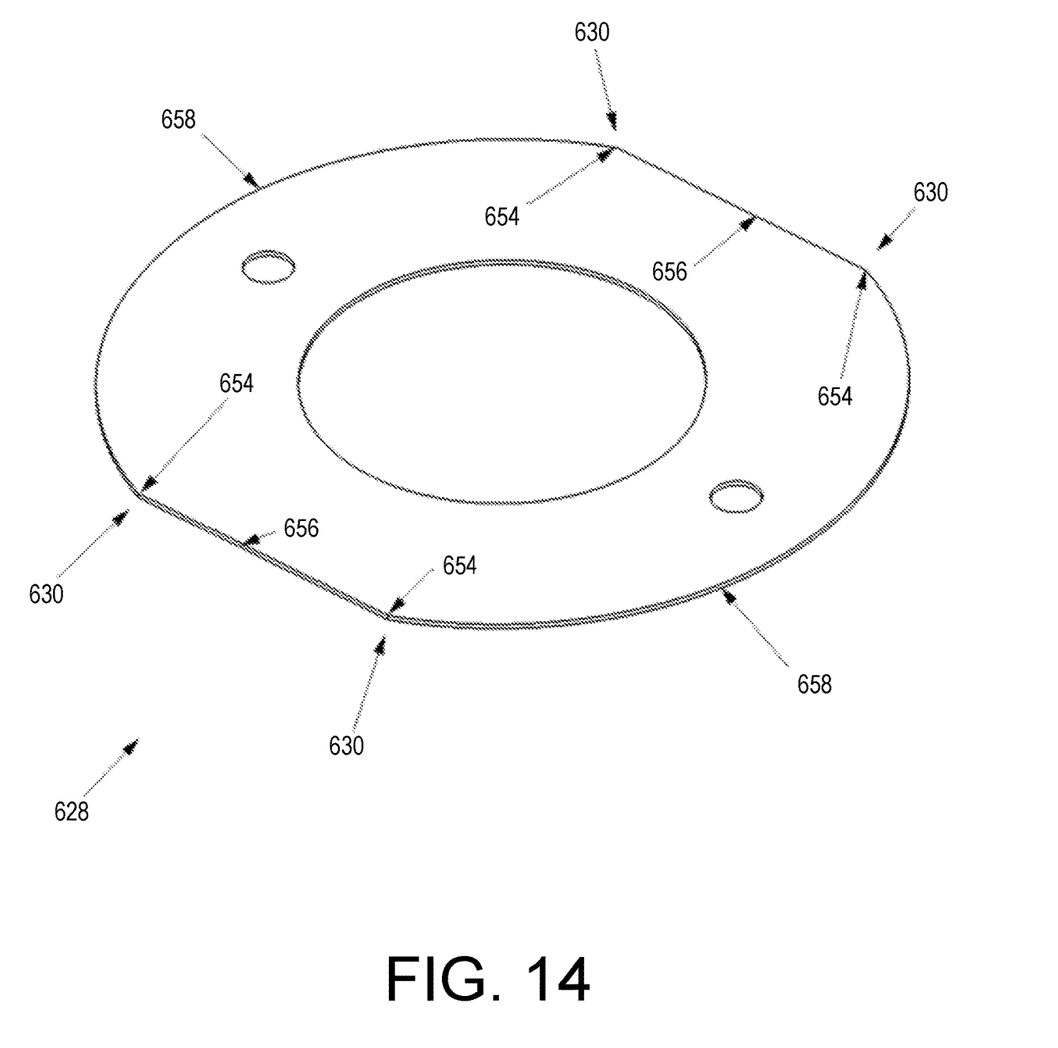
FIG. 14 is a perspective view of an example magnetic shield that may be used with a bearing holder, such as the integrated magnetic shield and bearing holder shown in FIGS. 12 and 13.

In some examples, the second layer 626 includes one or more ribs 670 (shown in FIG. 12) spaced circumferentially about the center axis 236 and extending radially between the shaft portion 610 and the outer wall 640. The ribs 670 may be connected to and extend longitudinally between, for example, the inner lip 662 and the outer lip 664. The lips 660 and/or ribs 670 are configured to support the magnetic shield 628 and define a plurality of second openings 634 (shown in FIG. 12). In some examples, the inner lip 662 and/or outer lip 664 extend radially from and circumferentially along the shaft portion 610 and/or outer wall 640, respectively, between an adjacent pair of ribs 670, such that the second opening 634 defined between the adjacent pair of ribs 670 has an annulus sectoral configuration. The ribs 670 may provide additional support to the magnetic shield 628 (for example, relative to a magnetic shield not supported by ribs) to reduce a likelihood of shape distortion during manufacture of the bearing holder unit 600. FIG. 14 shows the magnetic shield 628 free from the rest of the bearing holder unit 600.

The bearing holder unit 600 may be produced or manufactured using the system 400 and/or method 402. To form the lips 660 and define circumferential edges of the second openings 634, the lower rod 425 may have an annular configuration having an inner diameter that is a predetermined amount (for example, two times a length of the inner lip 662) greater than an inner diameter of the magnetic shield 628 (for example, width 348) and/or an outer diameter that is a predetermined amount (for example, two times a length of the outer lip 664) less than an outer diameter of the magnetic shield 628 (for example, width 352). To form the ribs 670 and define generally or substantially radial edges of the second openings 634, an upper surface of the lower rod 425 include one or more circumferentially-spaced, radially-extending channels defined therein. The bearing holder unit 600 may be formed to include and/or define one or more first features 630 that facilitate restricting rotation of the magnetic shield 628 relative to the first layer 624 and/or second layer 626 (for example, vertex 654, chord portion 656, lip 660, inner lip 662, outer lip 664), and one or more second features 630 that facilitate restricting translation of the magnetic shield relative to the first layer 624 and/or second layer 626 (for example, vertex 654, chord portion 656, lip 660, inner lip 662, outer lip 664).

Examples are described herein and illustrated in the accompanying drawings to disclose aspects of the disclosure and also to enable a person skilled in the art to practice the aspects, including making or using the above-described systems and executing or performing the above-described methods. Having described aspects of the disclosure in terms of various examples with their associated operations, it will be apparent that modifications and variations are possible without departing from the scope of the disclosure as defined in the appended claims. That is, aspects of the disclosure are not limited to the specific examples described herein, and all matter contained in the above description and shown in the accompanying drawings shall be interpreted as illustrative and not in a limiting sense.

Components of the systems and/or operations of the methods described herein may be utilized independently and separately from other components and/or operations described herein. Moreover, the methods described herein may include additional or fewer operations than those disclosed, and the order of execution or performance of the operations described herein is not essential unless otherwise specified. That is, the operations may be executed or performed in any order, unless otherwise specified, and it is contemplated that executing or performing a particular operation before, contemporaneously with, or after another operation is within the scope of the disclosure. Although specific features of various examples of the disclosure may be shown in some drawings and not in others, this is for convenience only. In accordance with the principles of the disclosure, any feature of a drawing may be referenced and/or claimed in combination with any feature of any other drawing.

When introducing elements of the disclosure or the examples thereof, the articles "a", "an", "the" and "said" are intended to mean that there are one or more of the elements. References to an "embodiment" or an "example" of the present disclosure are not intended to be interpreted as excluding the existence of additional embodiments or examples that also incorporate the recited features. The terms "comprising," "including," and "having" are intended to be inclusive and mean that there may be elements other than the listed elements. The phrase "one or more of the following: A, B, and C" means "at least one of A and/or at least one of B and/or at least one of C."

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A bearing holder unit for use with an electric power steering apparatus, the bearing holder unit comprising:
   a shaft portion including an inner wall and a ledge extending radially inward from the inner wall, the inner wall defining a channel; and
   a cover portion extending radially outward from the shaft portion, the cover portion including:
   a first layer;
   a second layer extending substantially parallel to the first layer;

a magnetic shield extending between the first layer and the second layer; and an outer wall extending from one or more of the first layer or the second layer such that a space is defined between the outer wall and the shaft portion, wherein the cover portion includes one or more retainers coupled to the magnetic shield to restrict movement of the magnetic shield relative to one or more of the first layer or the second layer.

2. The bearing holder unit of claim 1, wherein the inner wall and the ledge define a bearing pocket sized to house a bearing therein.

3. The bearing holder unit of claim 1, wherein the first layer, the second layer, and the magnetic shield extend substantially parallel to each other.

4. The bearing holder unit of claim 1, wherein the first layer has a first thickness and the second layer has a second thickness that is equal or substantially similar to the first thickness.

5. The bearing holder unit of claim 1, wherein the one or more retainers restrict rotation of the magnetic shield relative to one or more of the first layer or the second layer.

6. The bearing holder unit of claim 1, wherein the one or more retainers restrict axial movement of the magnetic shield relative to one or more of the first layer or the second layer.

7. The bearing holder unit of claim 1, wherein the one or more retainers restrict lateral movement of the magnetic shield relative to one or more of the first layer or the second layer.

8. The bearing holder unit of claim 1, wherein the one or more retainers include at least one opening defined through at least one of the first layer, the second layer, or the magnetic shield.

9. The bearing holder unit of claim 1, wherein the one or more retainers include at least one protrusion extending from at least one of the first layer, the second layer, or a base portion of the magnetic shield.

10. The bearing holder unit of claim 1, wherein the one or more retainers include at least one vertex at a radially outer surface of the first layer, the second layer, or a base portion of the magnetic shield.

11. The bearing holder unit of claim 1, wherein the one or more retainers include at least one lip extending radially from one or more of the shaft portion or the outer wall.

12. The bearing holder unit of claim 1, wherein the one or more retainers include at least one rib extending radially between the shaft portion and the outer wall.

13. The bearing holder unit of claim 1, wherein the magnetic shield is fabricated from a first material, and the shaft portion, the first layer, the second layer, and the outer wall are fabricated from a second material different from the first material.

14. A system for producing an integrated magnetic shield and bearing holder, the system comprising:

a stamping press configured to form a magnetic shield including one or more first retainers;

a mold defining a cavity; and one or more rods configured to position the magnetic shield in the cavity such that molding material is configured to flow above the magnetic shield and below the magnetic shield, the molding material forming a shaft portion and a cover portion of the integrated magnetic shield and bearing holder, wherein the cover portion includes a first layer, a second layer extending substantially parallel to the first layer, the magnetic shield extending between the first layer and the second layer, and an outer wall extending from one or more of the first layer or the second layer, and wherein one or more of the first layer or the second layer include one or more second retainers.

15. The system of claim 14, wherein the stamping press includes a blanking die configured to form at least one vertex at a radially outer surface of a base portion of the magnetic shield, the one or more first retainers including the at least one vertex.

16. The system of claim 14, wherein the stamping press includes a dimple die configured to form at least one protrusion extending from a base portion of the magnetic shield, the one or more first retainers including the at least one protrusion.

17. The system of claim 14, wherein the one or more rods are configured to define at least one opening extending through the one or more of the first layer or the second layer, the one or more second retainers including the at least one opening.

18. The system of claim 14, wherein one or more of the mold or the one or more rods are configured to form at least one lip extending radially from one or more of the shaft portion or the outer wall, the one or more second retainers including the at least one lip.

19. The system of claim 14, wherein one or more of the mold or the one or more rods are configured to form at least one rib extending radially between the shaft portion and the outer wall, the one or more second retainers including the at least one rib.

20. A method of forming an integrated magnetic shield and bearing holder, the method comprising:

forming a magnetic shield including one or more first retainers;

positioning the magnetic shield in a cavity defined by a mold;

forming a shaft portion and a cover portion of the integrated magnetic shield and bearing holder, the cover portion including a first layer, a second layer extending substantially parallel to the first layer, the magnetic shield extending between the first layer and the second layer, and an outer wall extending from one or more of the first layer or the second layer, wherein one or more of the first layer or the second layer include one or more second retainers; and extracting the integrated magnetic shield and bearing holder from the cavity defined by the mold.

* * * * *